350-403 SR

OR 4,116,534

A 350/157

United [11] 4,116,534

[redacted] McMahon [45] Sep. 26, 1978

[54] APPARATUS AND METHOD FOR HIGH SPEED ACCESSING OF CHARACTER IMAGES

[75] Inventor: Donald H. McMahon, Carlisle, Mass.

[73] Assignee: Sperry Rand Corporation, New York, N.Y.

[21] Appl. No.: 784,087

[22] Filed: Apr. 4, 1977

[51] Int. Cl.[2] .................... G03B 27/16; B02B 27/17

[52] U.S. Cl. .................................... 350/157; 354/12

[58] Field of Search ................ 350/157; 354/5, 10–13, 354/17, 232

[56] References Cited

U.S. PATENT DOCUMENTS 3,182,574 5/1965 Fleisher et al. ........................ 354/11

3,532,033 10/1970 Chang .................................. 354/12

*Primary Examiner*—John K. Corbin

*Assistant Examiner*—Wm. W. Punter

*Attorney, Agent, or Firm*—Howard P. Terry; Seymour Levine

[57] ABSTRACT

A method and apparatus for rapidly changing the spatial modulation imposed on a stationary light beam to conform to a preselected one of a multiplicity of discrete character symbols. Automatic orientation tracking is provided which establishes a fixed direction for the spatially modulated light beam that is independent of the character accessed and provides a fixed position for the character image. The technique may be employed in electrographic high speed printers and has particular utility when used with standard character generating template masks for character generation, though it is also effective when employed with a holographic generating mask array.

26 Claims, 6 Drawing Figures

10
11
12
13
14
15
16
17
18
21
22
23
θ
θ'

36
37
37a
38
40
41
42
43
44
45

APPARATUS AND METHOD FOR HIGH SPEED ACCESSING OF CHARACTER IMAGES

BACKGROUND OF THE INVENTION

1. Field of the Invention

This invention pertains to a method and apparatus for optically accessing a preselected character of a multiplicity of discrete characters contained in an array and more particularly for rapidly accessing the preselected one and providing an image thereof at a location independent of the character accessed.

2. Description of the Prior Art

Standard impact printer systems employ a rotating or translating member that contains one or more sets of the character vocabulary. To access the proper character an instant of time is selected, from the total available cycle time, at which the impact of a hammer transfers the desired character from the rotating or translating member to the print out paper. This approach has been employed to produce an optical printer wherein a light beam is directed to a mask, containing transparencies or templates of the character vocabulary, at at the proper time to illuminate the desired character contained therein. The spatially modulated beam resulting therefrom is focused upon a photoconductive drum member of an electrophotographic copier system wherein the character is rendered visible and transferred to a hard copy paper image. This time-domain accessing of characters requires the light beam, which illuminates the rotating character mask, to be pulsed not only at the proper time to select the desired character but in such a fashion as to hold character blurring within acceptable tolerances. Consequently, the average light pulse duty cycle must include a pulse that is sufficiently brief to provide an instantaneous snapshot of the selected character at an interpulse period, of average duration, that is equivalent to one cycle of the entire vocabulary of characters. To prevent blurring the character motion must be less than five percent. Thus, if the printable vocabulary contains 100 symbols an average light pulse duty cycle of $5 \times 10^{-4}$ is required. This duty cycle dictates at peak power level for the pulse system's light source that is 2,000 times greater than that of a light source in an illumination system which could function with a 100 percent duty cycle.

Time domain accessing for optical printing systems as described above exhibit printing speed limitations. A system employing a character reel that rotates at 3600 rpm and carries two vocabulary sets on its circumference has a printing rate of 120 characters per second or approximately 60 lines of printing per minute. To surmount this printing speed limitation a multiplicity of light sources had been employed. Printing speeds of several thousand lines per minute have been achieved by employing one light source for each printing line on a page. This is a brute force approach that is expensive and which results in a short MTBF. Printing speeds of optical printing systems may be increased by replacing the time dimension accessing procedure with a system that randomly positions the beam to access the character mask. Position accessing refers to the procedure whereby stationary array of characters is addressed by altering the direction of the light beam to strike the desired character template. However, in position accessing, the change in light beam direction produced to address each character template, must be subsequently eliminated so that the final beam position for each character accessed remains unchanged.

SUMMARY OF THE INVENTION

The subject invention provides a method and apparatus for rapidly accessing a preselected character symbol generator, from a multiplicity of character symbol generators, and establishes an image of the character symbol, represented by the character symbol generator accessed, at a fixed image position that is independent of the character symbol generator accessed. According to the invention, a light beam from an external source, having a given linear polarization is incident to a birefringent prism along a propagation path associated with the given polarization and is refracted by the prism to propagate along the prism's common path. This polarization vector is oriented at an angle of 45° to the optical axes of an optical quarter wave plate to which the light beam, propagating along the common propagation path, is incident. By virtue of the property of the optical quarter wave plate a right circular polarized wave emerges therefrom and is deflected by a moveable mirror towards a refracting lens which substantially collimates the light beam. This collimated light beam is perpendicularly incident to a flat mirror with a spot size that is determined by a multi-lens telescope having a lens in the path of the beam incident to the birefringent prism and a lens in the common beam path that is interposed between the deflecting mirror and the quarter wave plate. The light beam is reflected from the mirror with a beam waste greater than that of the incident beam and is spatially modulated by the character symbol generator accessed by the moveable deflecting mirror. The spatially modulated light beam, which is again right circularly polarized, is focused by the collimating lens and propagates back along the path towards the deflecting mirror wherefrom it is deflected with left circular polarization to the quarter wave plate. This left circular polarization is connected by the quarter wave plate to a linear polarization with a polarization vector that forms an angle of −45° with the optical axes of the quarter wave plate and is orthogonal to the polarization of the light beam incident to the quarter wave plate from the birefringent prism. From the quarter wave plate, the orthogonally polarized light beam propagates along the common path to the birefringent prism from which it is refracted to propagate along the second propagation path to form an image at a fixed position that is independent of the character symbol generator accessed.

Another embodiment of the invention utilizes an acousto-optic deflector to deflect an incident light beam at an angle corresponding to the character symbol generated to be accessed. The deflected beam is collimated by a collimating lens and is incident to a biprism on one side of the symmetry axis and refracted thereby to illuminate a flat mirror placed immediately behind the character symbol accessed. The mirror reflects the beam towards the half of the biprism on the other side of the plane of symmetry with a beam waste that is greater than the spot size illuminating the mirror. This reflected beam is spatially modulated by the character symbol generator, refracted by the biprism back towards the acousto-optic deflector, and focused by the collimating lens prior to a deflection by the acousto-optic deflector along a given path, that crosses the path of the incident beam, to form an image at a fixed position that is independent of the character symbol generator accessed.

DESCRIPTION OF THE PREFERRED EMBODIMENTS

Figures 1, 3:
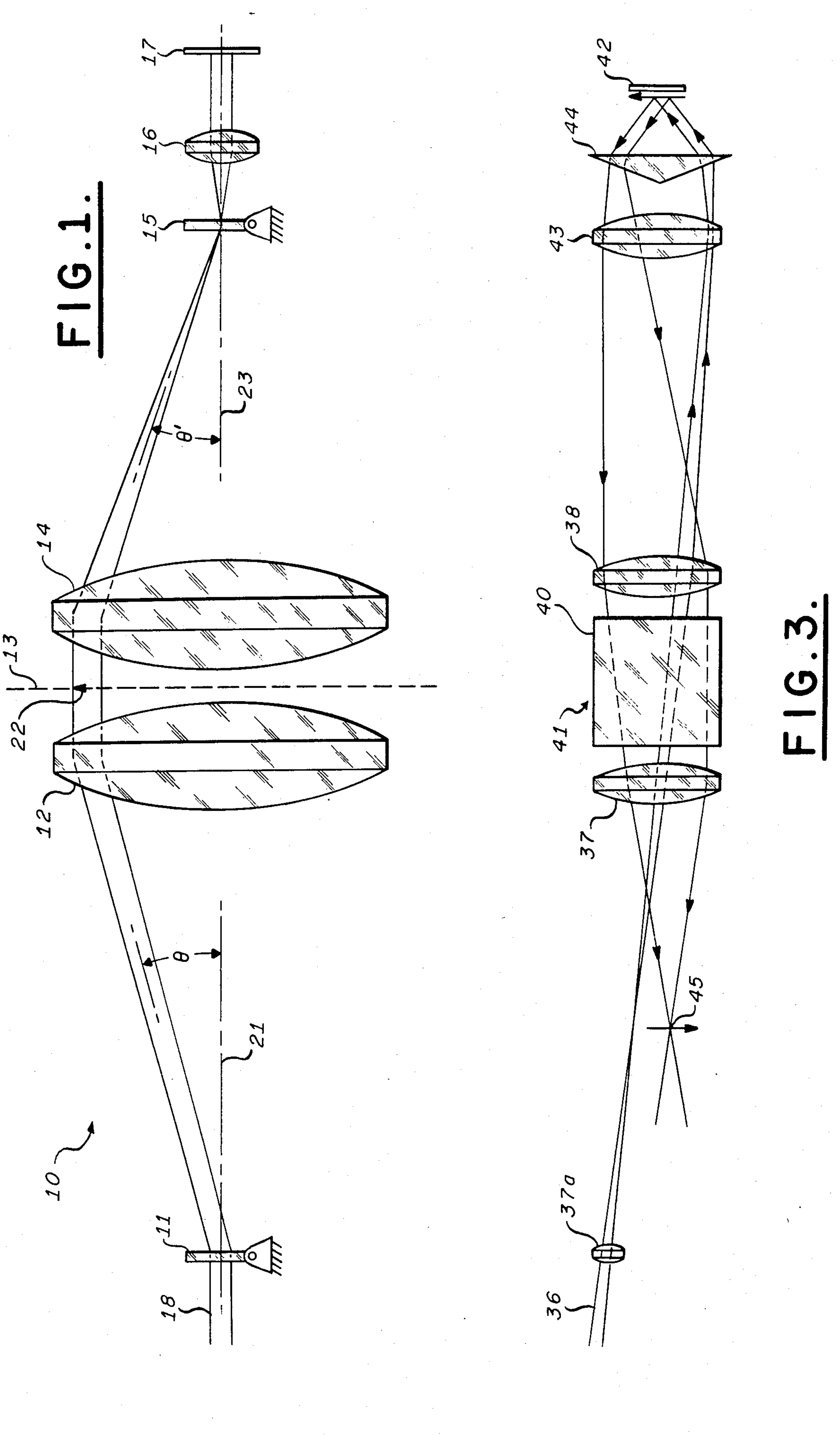
FIG. 1 is an optical schematic diagram generally illustrating one form of the invention.
FIG. 3 is an optical schematic diagram of an embodiment of the invention utilizing an acousto-optic vertical deflector.

FIG. 1 shows, in schematic form, a character accessing system 10 wherein the character is imaged at a position that is independent of the character accessed. The system comprises a beam deflector 11 located at the focal point of a first lens 12, a character mask 13 haveng a multiplicity of character symbol generators, interposed between the first lens 12 and a second lens 14, at the focal point of which a second beam deflector 15 is located. Subsequent to the second beam deflector 15 is a lens 16 and a stationary character image position 17.

A light beam 18, which is used to access a character symbol generator on the character mask 13, is deflected by the beam deflector 11 at an angle $\theta$ from the axis 21 of the first lens 12. The deflected beam is collimated by lens 12, at a distance from the axis 21 that is determined by the focal length of the lens and the deflection angle $\theta$ and illuminates a character symbol generator 22 on the character mask 13 thereat. This character symbol generator illumination causes a spatially modulated light beam which is representative of the character symbol desired, to be incident to the second lens 14 and focused therefrom to the second beam deflector 15, forming an angle $\theta'$ with the axis 23 of the lens 14. Deflector 15 deflects the light beam, which has been spatially modulated by the character symbol generator 22, through lens 16, wherefrom it is focused to the image position 17. Deflectors 11 and 15 may be a galvanometer type such as the General Scanning Company's GO612 and the Minneapolis-Honeywell Company's M25K or an acousto-optic type manufactured by the Soro and Isomet Companies.

Deflector 11 must provide a beam sufficiently broad to fully illuminate each character 22 in the character mask 13. Consequently, the size of each character 22 (C), the size of the deflector 11 (D), the focal length (f) of the lens 12 and the wavelength ($\lambda$) of the light beam are interrelated, this interrelationship being given by $C = 2f\lambda/D$. Additionally, to provide a recognizable character at the character image position 17 each character symbol generator 22 must be decomposed into a multiplicity of resolution elements each of which is considerably smaller than the character size (C). This resolution element size ($m$) and the focal length ($f'$) of the second lens 14 determines the minimum size of the second deflector 15 (D') which is given by $D' = 2f'\lambda/m$. With N resolution elements in each character symbol generator 22, the minimum size (D') of the second deflector 15 is related to the size of the first deflector 11 by $D' = N(f'/f)D$. Consequently, for $D = D'$, $f/f' = N$ which implies that the angle of deflection with respect to the axis 23 of the second lens 14 is greater than the angle of deflection with respect to the axis 21 of the first lens 12 by a factor N. If the focal lengths are made equal, thus equalizing the angles of deflection, then $D'/D = N$ and the diameter of the second deflector must be N times the size of the first deflector. It is significant to note that the spatial modulation imposed on the beam by the character symbol generator 22 cannot be transmitted through the second deflector 15 unless its aperature is sufficiently large, or alternatively its deflection range is sufficiently large, that it can resolve a number of positions, in terms of the Raleigh criteria, that are equal to the product of the number of characters in the vocabulary times the number of linear resolution elements per character.

Figures 2, 4:
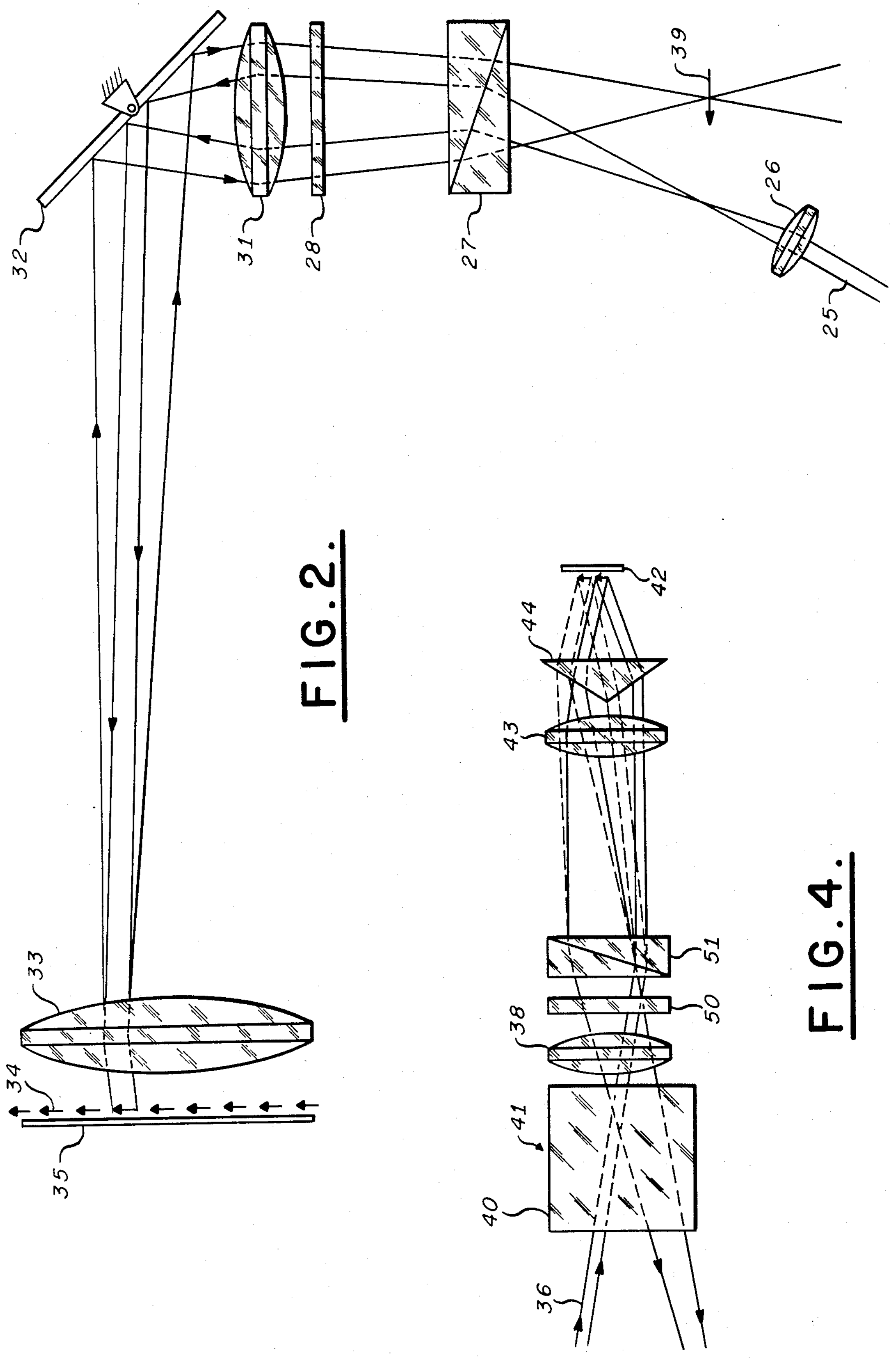
FIG. 2 is an optical schematic diagram illustrating a preferred embodiment of the invention.
FIG. 4 is an optical schematic diagram of an emobdiment of the invention illustrating the utilization of a birefringent prism and an optical half wave plate with an acousto-optic deflector to double the vocabulary of the embodiment illustrated in FIG. 3

Refer now to FIG. 2 which shows, in schematic form, an embodiment of the invention wherein an optical path is folded back on itself so that a single light deflector functions both as a character symbol generator addressing device and as a beam direction restoring device. In FIG. 2, a linearly polarized light beam 25 is incident to a first lens 26, propagating therefrom through a birefringent prism 27 and an optical quarter wave plate 28, to a focusing lens 31 from which a light beam emerges with a predetermined spot size. The beam is then deflected from a mirror light beam deflector 32 to a second lens 33, which refracts the beam to emit a substantially collimated beam that is substantially perpendicular to a character mask 34-mirror 35 combination. This collimated-like beam provides a diffraction limited spot on the character mask-34 which illuminates a character symbol generator thereon addressed by the deflector 32. The character mask 34 is placed immediately adjacent to the mirror reflector 35 and light transmitted through the accessed character symbol generator is reflected from the flat mirror 35, and is retransmitted through the accessed character symbol generator, emerging with a spatial modulation representative of the desired character symbol. Lens 33 performs an imaging function for the spatially modulated beam. From lens 33 to spatially modulated beam is deflected from the deflector 32 and propagates through lens 31, the quarter wave plate 28 and the birefringent prism 27 to be focused at an image position 39 which is independent of the character generator accessed.

Lenses 26 and 31 comprise a telescope which limits the beam waist of the optical beam initially incident to the mirror 35. This limited aperture illumination results in an optical beam, reflected from the mirror 35 which, due to the presence of the character mask 34, exhibits a larger diffraction limited beam waist at deflector 32 than that of the beam incident on the first pass thereto. If $n$ is the number of linear resolution cells per character and N the number of characters on the linear mask array 34, the optical beam on the first deflection from deflector 32 must be $n$ times smaller than the aperature of the deflector 32, and to provide the required character resolutions, the deflector 32 must be capable of resolving at least the number of discrete beam positions equal to the product of the number N of characters on the linear mask array 34 times the number of linear resolution elements *n* per character.

The linear polarized beam emitted from lens 26 may be refracted from the birefringent prism 27 to be incident to the quarter wave plate 28 with a polarization angle of 45° relative to the optical axes thereof. As is well known in the art, this incident linear polarized light beam may be arranged to be emitted from the quarter wave plate 28 as a right circularly polarized beam. After being reflected from the character mask 34-mirror 35 and twice by the deflector 32, the circular polarized beam is returned to the quarter wave plate 28 and emerges therefrom with a linear polarization angle of −45° relative to the optical axes thereof (i.e., orthogonal to the polarization of the beam initially incident to the birefringent prism 27 from the lens 26). This orthogonally polarized beam is then incident to the birefringent prism 27 wherefrom it emerges in a fixed direction that differs from that of the beam incident to the birefringent prism 27 from the lens 26 and provides an image at a fixed position 39 that is independent of the character accessed.

Refer now to FIG. 3 wherein is shown, in schematic form, a modification of the embodiment of FIG. 2. In FIG. 3, which is shown in vertical cross-section, An optical beam 36, from an external source (not shown) propagates through lenses 37*a* and 37 to an acousto-optic deflector 41, which is oriented to provide optical beam deflections in the horizontal plane. This deflection is utilized to address a character symbol generator on a one-dimensional reflecting character array 42, which extends along the horizontal plane. It is to be noted that proper operation of the acousto-optic deflector 41 requires that the light beam propagating therethrough be substantially collimated. After deflection by the acousto-optic deflector 41, the beam propagates through lens 38, which in combination with the lenses 37*a* and 37 form a telescope to provide a predetermined beam waist for the beam emerging from lens 38. The beam then propagates through lens 43, emerging therefrom as a substantially collimated beam, and is refracted in the vertical plane by biprism 44 to illuminate the addressed character on the linear array reflecting character mask 42. The light beam incident from biprism 44 is reflected from the linear array reflecting character mask in a manner similar to that of the reflection from the mirror 35-character mask 34 combination of FIG. 2 previously described. Biprism 44 and lens 43, which performs an imaging function for the spatially modulated beam, refract the beam reflected from the character mask-mirror combination 42 along a path in the vertical plane that is in a direction other than the direction of the incident beam 36. The beam so refracted propagates through lens 38 to the acousto-optic deflector 41, wherein it experiences the same deflection as the beam incident from lens 37*a*. The reflected beam after deflection by the acousto-optic deflector 41 provides an image of the accessed character at a fixed position 45 that is independent of the character accessed. In the apparatus described above, lenses 37 and 38 possess different focal lengths. This permits the character size on the character mask to be selected by adjusting the distance between the lens 38 and the linear array reflecting-character mask 42 while maintaining the beam size at the acousto-optic deflector at a predetermined dimension.

A modification of the invention shown in FIG. 3 is illustrated in FIG. 4. In FIG. 4, only the modified portion of the apparatus of FIG. 3 is shown. The modified section of the apparatus comprises the acousto-optic deflector 41, the lens 38, a switchable electro-optic half-wave plate 50, a birefringent prism 51, the collimating lens 43, the biprism 44 and the reflecting character mask 42. The incident beam 36 to the acousto-optic deflector 41 is deflected therein, propagates through lens 38 and is incident to the electro-optic half-wave plate which switchably rotates the polarization of the incident beam 36 to the orthogonal polarization when activated. With the switchable half-wave plate 50 unactivated, the incident beam propagates through the birefringent prism 51, being refracted thereby, in the vertical plane, at the refracting angle for the incident polarization. The vertically deflected beam then propagates through the collimating lens 43, wherefrom it is refracted to the accessed character by means of the biprism 44. The spatially modulated beam reflected from the reflecting character mask 42 propagates through the birefringent prism 51, the switchable electro-optic half-wave plate 50 and the remaining elements of the system to be focussed at the image position in a manner similar to that previously described. When the polarization switch 51 is activated, the incident beam 36 propagates therefrom with a polarization that is orthogonal to that of the incident beam when the switch is unactivated. This orthogonally polarized beam is incident to the birefringent prism 51 and is refracted therefrom at an angle other than that of the unrotated polarized beam. Propagation of the rotated polarized beam continues through the lens 43 and the biprism 44 to access a character positioned above the character accessed by the unrotated polarized beam. Reflection from the reflecting character mask 42 to a focused image at the image position for the rotated polarized beam is identical to that of the unrotated polarized beam, thus the vocabulary of the system is doubled by the addition of an electro-optic half-way plate 50, which provides switchable polarizations, and a birefringent prism 51. It should be clear to those skilled in the art that the vocabulary may be further extended with this technique by using additional combinations of polarization switches and birefringent prisms, with *n* combination extending the system vocabulary by a factor of $2^n$.

Figure 5:
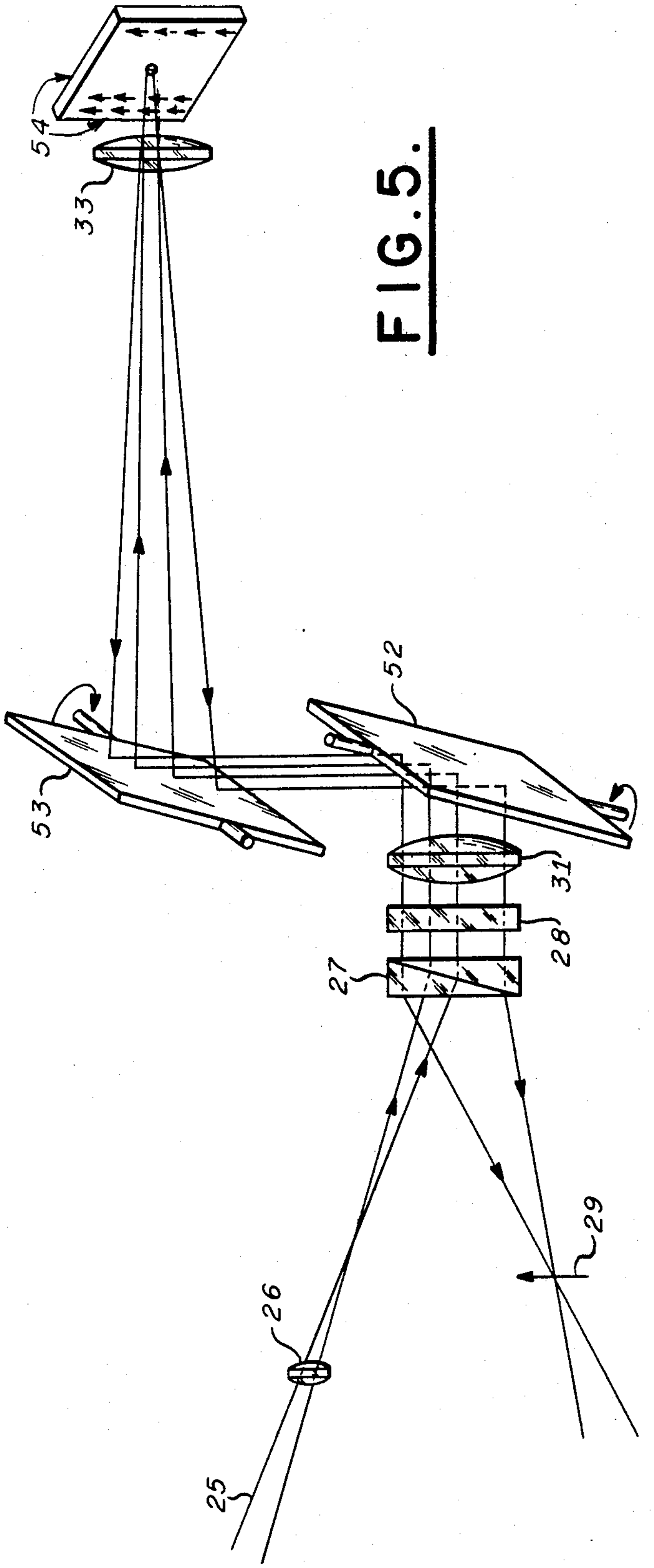
FIG. 5 is an optical schematic diagram of an embodiment of the invention wherein a two-dimensional deflection system is employed.

Two rotatable reflectors are utilized in the embodiment of the invention illustrated in FIG. 5. The structural arrangement is the same as in FIG. 2 with the exceptions that the deflector 32 is replaced by two deflectors, one for deflecting the beam horizontally, the other for deflecting the beam vertically and the linear array reflecting-character mask comprising the character mask 34 and the mirror 35 is replaced by a reflecting character mask having an *mxn* array of character symbol generators in which *m* rows may be substantially perpendicular to the *n* columns. The operation is similar to that of the device of FIG. 2. An incident beam 25 propagates through lens 26 to a birefringent prism 27 from which it passes through a quarter-wave optical plate 28 and lens 31. From lens 31 the beam is horizontally deflected at the proper horizontal angle for accessing the desired character by rotating deflector 52 which is positioned at an angle with respect to the vertical to deflect the beam to deflector 53. Deflector 53 is rotatable to vertically deflect the beam at the proper vertical angle for accessing the desired character symbol generator. Thus, the beam has been deflected horizontally and vertically to access a character symbol generator of the array of character symbol generators on the reflecting-character array mask 54. The beam reflected from the reflecting-character array mask 54 is then deflected from deflector 53 to deflector 52 from which it propagates through lens 31 to the optical quarter-wave plate 28 wherein the polarization is rotated as previously described, and refracted from the birefringent prism 27 to the character image position 29, all as previously described for the apparatus of FIG. 2. It should be obvious to those skilled in the art that the order of deflection is not critical and that the deflectors 52 and 53 may be interchanged to provide an initial vertical deflection and a subsequent horizontal deflection to access the character symbol generator desired.

Figure 6:
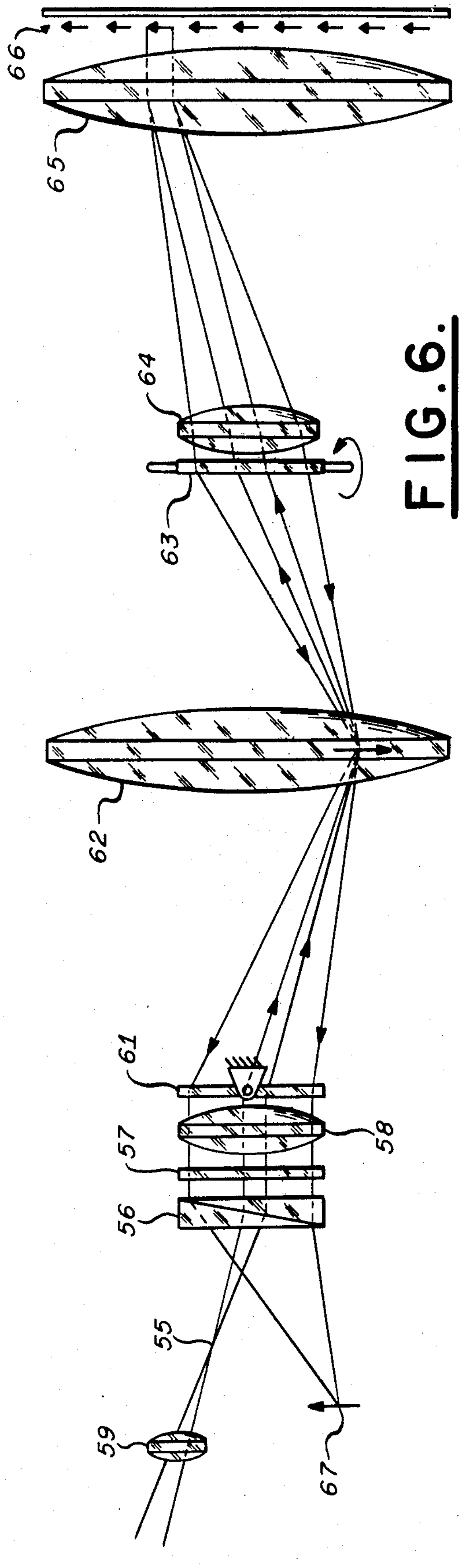
FIG. 6 is an optical schematic diagram of an embodiment of the invention illustrating an alternative two-dimensional deflection system to that of FIG. 5.

Another embodiment utilizing vertical and horizontal deflectors is illustrated in FIG. 6, wherein is shown an accessing beam 55 which emerges from a lens 59 to which an external linear polarized beam is incident. The accessing beam 55 propagates through a birefringent prism 56, an optical quarter-wave plate 57, and a lens 58 to a vertical deflector 61. The effect on the beam 55, as it propagates through these elements is as previously described. The beam incident to deflector 61 is vertically deflected therefrom to lens 62, being focused on the vertical axis thereof and refracted therefrom to illuminate a horizontal deflector 63. After the deflection from the horizontal deflector 63 the beam propagates through lens 64, which with lenses 59 and 58 comprise a telescope which limits the beam waist of the beam incident to lens 65. Lens 65 collimates the beam incident thereto and the collimated beam propagating therefrom illuminates the accessed character symbol generator in the reflective character array mask 66. The spatially modulated beam reflected from the reflecting-character array mask 66 propagates through the lens 65, which performs an imaging function for the spatially modulated beam, and lens 64 to deflector 63 wherefrom it is deflected to be focused on the vertical axis of lens 62, whereat an inverted image appears. The spatially modulated beam emerging from lens 62 is deflected from deflector 61 to lens 58, propagating therethrough to the optical quarter-wave plate 57, wherein a 90° polarization rotation occurs. The polarization rotated beam, emerging from the optical quarter-wave plate 57, propagates through the birefringent prism 56 from which it is refracted, at an angle other than the angle of incidence of the incident beam 55, to a fixed imaging position 67. It should be apparent to those skilled in the art that the order of deflection of the optical beam is not critical and that the horizontal and vertical deflectors 61 and 63 may be interchanged.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for accessing one character symbol generator from a multiplicity of character symbol generators and for providing an image of a character symbol that is represented by said accessed one character symbol generator, at a predetermined fixed position that is independent of said one character symbol generator accessed, comprising:

means for emitting a light beam from a second end thereof in response to a light beam from an external source that is incident to a first end thereof at a first deviation angle thereto, and for emitting a light beam from said first end at a second deviation angle thereto, differing from said first deviation angle, in response to a light beam incident to said second end;

means for deflecting a light beam incident thereto from said second end of said deviation means in a direction determined by a selected angle of deflection corresponding to said one character symbol generator and for deflecting a light beam incident thereto from said direction to said second end of said deviation means;

means for emitting a substantially collimated light beam, having predetermined beam dimensions, in response to said light beam deflected from said deflector means; and character generating means having a multiplicity of character generators, each of dimensions substantially equal to said predetermined beam dimensions, one of which, that corresponds to said one character symbol generator, is illuminated by said light beam emitted from said collimating means, said illuminating beam being spatially modulated by said one character symbol generator and reflected therefrom to be incident to said collimating means wherefrom said spatially modulated beam illuminates said deflector and is deflected to said second end of said deviating means, emerging from said first end at said second deviation angle and focused at said predetermined fixed position that is independent of said one character symbol generator accessed.

2. An apparatus for imaging a preselected character symbol, from a multiplicity of character symbols, at a predetermined fixed position that is independent of the character symbol selected in accordance with claim 1 further including a plurality of lens elements interspersed between said external source, said deviation means and said deflecting means to form a telescope, whereby said light beam emitted from said deviation means is incident to said deflecting means with a predetermined spot size.

3. An apparatus for imaging a preselected character symbol, from a multiplicity of character symbols, at a predetermined position that is independent of the character selected in accordance with claim 1, wherein said deviation means comprises:

a birefringent prism which emits a light beam having a predetermined linear polarization from a second surface thereof in response to a light beam having said predetermined linear polarization incident to a first surface thereof at said first deviation angle from said external source, and emits a light having a linear polarization orthogonal to said predetermined linear polarization at said second deviation angle to said first surface in response to a light beam having said orthogonal polarization incident to said second surface; and a quarter wave plate with optical axes oriented with respect to said predetermined linear polarization such that a light beam having substantially circular polarization, with the polarization vector rotating in a predetermined direction, is emitted from a second surface thereof in response to said light beam incident to a first surface thereof from said birefringent prism and a light beam having a linear polarization, orthogonal to said predetermined linear polarization, is emitted from said first surface thereof to illuminate said second surface of said birefringent prism is response to a substantially circularly polarized wave, with a polarization vector rotating in an angular direction opposite to said predetermined angular direction, incident to said second surface thereof.

4. An apparatus for imaging a preselected character symbol, from a multiplicity of character symbols at a predetermined position that is independent of the character symbol selected in accordance with claim 3, wherein said deflector means is of the type that provides a mirror on a galvanometer movement.

5. An apparatus for imaging a preselected character symbol, from a multiplicity of character symbols, at a predetermined position that is independent of the character selected in accordance with claim 3, further including a first lens interposed between said external source and said birefringent prism and a second lens interposed between said quarter wave plate and said deflector means, said first and second lenses comprising a telescope such that a light beam emitted from said second surface of said quarter wave plate is incident to said deflector means with a predetermined spot size.

6. An apparatus for imaging a preselected character symbol, from a multiplicity of character symbols, in a predetermined position that is independent of the character symbol selected in accordance with claim 1 wherein: said character generator means comprises a multiplicity of character symbol generators adjacently disposed to form first and second lines of character symbol generators such that each of said first lines is in a substantially perpendicular relationship with each of said second lines; and said deflection means comprises a first deflector, illuminated by said light beam emitted from said deviation means, and a second deflector illuminated by said light beam deflected from said first deflector, said first deflector for deflecting said light beam at a first deflection angle to select one of said first lines of character symbol generators and said second deflector for deflecting said light beam at a second deflection angle to select one of said second lines of character symbol generators, whereby said selected character symbol generator positioned on one of said first lines corresponding to said first deflection angle and on one of said second lines corresponding to said second deflection angle is thereby illuminated.

7. An apparatus for imaging a preselected character symbol from a multiplicity of character symbols at a predetermined position that is independent of the character selected in accordance with claim 6 wherein said deviation means comprises:

a birefringent prism which emits a light beam having a predetermined linear polarization from a second surface thereof in response to a light beam having said predetermined linear polarization incident to a first surface thereof at said first deviation angle from said external source, and emits a light having a linear polarization orthogonal to said predetermined linear polarization at said second deviation angle to said first surface in response to a light beam having said orthogonal polarization incident to said second surface; and a quarter wave plate with optical axes oriented with respect to said predetermined linear polarization such that a light beam having substantially circular polarization, with the polarization vector rotating in a predetermined direction, is emitted from a second surface thereof in response to said light beam incident to a first surface thereof from said birefringent prism and a light beam having a linear polarization orthogonal to said predetermined linear polarization, is emitted from said first surface thereof to illuminate said second surface of said birefringent prism in response to a substantially circularly polarized wave, with a polarization vector rotating in an angular direction opposite to said predetermined angular direction, incident to said second surface thereof.

8. An apparatus for imaging a preselected character symbol from a multiplicity of character symbols at a predetermined position that is independent of the character symbol selected in accordance with claim 7, wherein said first and second deflector means are of the type that provide a mirror on a galvanometer movement.

9. An apparatus for imaging a preselected character symbol, from a multiplicity of character symbols, at a predetermined position that is independent of the character selected in accordance with claim 8, further including a first lens interposed between said external source and said birefringent prism and a second lens interposed between said quarter wave plate and said first deflector means, said first and second lenses comprising a telescope such that a light beam emitted from said second surface of said quarter wave plate is incident to said deflector means with a predetermined spot size.

10. An apparatus for imaging a preselected character symbol, from a multiplicity of character symbols, at a predetermined position that is independent of the character symbol selected in accordance with claim 1, wherein said character generator means comprises a multiplicity of character symbol generators adjacently disposed to form a first set of lines of character symbol generators, said character symbol generators arranged in such a manner on each of said first set of lines as to form a second set of lines of character symbol generators that are in a perpendicular relationship with said first set, and said deflecting means comprises:

first deflection means for deflecting said light beam along said first set of lines of character symbol generators;

means for refracting said light beam from said first deflection means at a predetermined refraction angle; and second deflection means for deflecting said light beam refracted from said refraction means along said second set of lines of character symbol generators.

11. An apparatus for imaging a preselected character symbol, from a multiplicity of character symbols, at a predetermined position that is independent of the character selected in accordance with claim 10 wherein said deviation means comprises:

a birefringent prism which emits a light beam having a predetermined linear polarization from a second surface thereof in response to a light beam having said predetermined linear polarization incident to a first surface thereof at said first deviation angle from said external source, and emits a light having a linear polarization orthogonal to said predetermined linear polarization at said second deviation angle to said first surface in response to a light beam having said orthogonal polarization incident to said second surface; and a quarter wave plate with optical axes oriented with respect to said predetermined linear polarization such that a light beam having substantially circular polarization, with the polarization vector rotating in a predetermined direction, is emitted from a second surface thereof in response to said light beam incident to a first surface thereof from said birefringent prism and a light beam having a linear polarization, orthogonal to said predetermined linear polarization, is emitted from said first surface thereof to illuminate said second surface of said birefringent prism in response to a substantially circularly polarized wave, with a polarization vector rotating in an angular direction opposite to said predetermined angular direction, incident to said second surface thereof.

12. An apparatus for imaging a preselected character symbol from a multiplicity of character symbols at a predetermined position that is independent of the character symbol selected in accordance with claim 11, wherein said first and second deflector means are of the type that provides a mirror on a galvanometer movement.

13. An apparatus for imaging a preselected character symbol, from a multiplicity of character symbols, at a predetermined position that is independent of the character selected in accordance with claim 11, further including a first lens interposed between said external source and said birefringent prism and a second lens interposed between said quarter wave plate and said first deflector means, said first and second lenses comprising a telescope such that a light beam emitted from said second surface of said quarter wave plate is incident to said deflector means with a predetermined spot size.

14. An apparatus for accessing one character symbol generator from a multiplicity of character symbol generators, and for providing an image of a character symbol that is represented by said accessed one character symbol generator at a predetermined position that is independent of said character symbol generator accessed, comprising:

means for deflecting light beam, from an external source, incident thereto in a predetermined plane at an angle relative to a given reference axis:

means for receiving said deflected light beam at a first surface thereof and emitting a substantially collimated light beam having predetermined beam dimensions from a second surface thereof and for receiving a spatially modulated light beam, representative of a character symbol, at said second surface and providing an image of said character symbol at a predetermined image position;

means for refracting said substantially collimated light beam in a plane perpendicular to said predetermined plane; and character generating means having a multiplicity of character generators, each with dimensions substantially equal to said predetermined beam dimensions, positioned to receive light beams deflected by said deflecting means and refracted by said refracting means such that said light beam deflected at said angle relative to said given reference axis is incident to said one character symbol generator and reflected therefrom as a spatially modulated light beam representative of said one character symbol, said reflected spatially modulated light beam being refracted by said refracting means to illuminate said second surface of said collimating means and emitted from said first surface thereof to be deflected by said deflecting means and focused at said predetermined image position.

15. An apparatus for imaging a preselected character symbol, from a multiplicity of character symbols, at a preselected position that is independent of the character symbol selected in accordance with claim 14, wherein said refracting means is a biprism.

16. An apparatus for imaging a preselected character symbol, from a multiplicity of character symbols, at a predetermined position that is independent of the character symbol selected in accordance with claim 15, further including optical lenses interposed between said external source and said collimating means to form a telescope whereby said light beam is incident to said deflection means with a predetermined spot size.

17. An apparatus for imaging a preselected character symbol, from a multiplicity of character symbols, at a predetermined position that is independent of the character symbol selected in accordance with claim 16, wherein said telescope includes first and second lenses interposed between said external source and said deflection means and a third lens interposed between said collimating means and said deflection means.

18. An apparatus for imaging a preselected character symbol, from a multiplicity of character symbols, at a predetermined position that is independent of the character symbol selected in accordance with claim 17, wherein said deflection means is an acousto-optic deflector positioned to deflect a light beam, incident thereto, in said predetermined plane.

19. An apparatus for imaging a preselected character symbol, from a multiplicity of character symbols, at a predetermined position that is independent of the character symbol selected in accordance with claim 17, wherein said character generator means comprises a multiplicity of character symbol generators adjacently disposed to form at least two lines of character symbol generators in said plane perpendicular to said predetermined plane and further including means interposed between said third lens and said collimating means for switchably altering the path of said light beam emitted from said third lens in said plane perpendicular to said predetermined plane whereby character symbol generators contained in said at least two lines are switchably accessed.

20. An apparatus for imaging a preselected character symbol, from a multiplicity of character symbols, at a predetermined position that is independent of the character symbol selected in accordance with claim 19 wherein said switchable means comprises:

means for switchably rotating the polarization of said beam emitted from said third lens, between a first polarization and a second polarization that is orthogonal to said first polarization;

means for refracting said light beam in said perpendicular plane at a first angle in response to said first polarization and at a second angle in response to said orthogonal polarization.

21. A method for accessing one character symbol generator, from a multiplicity of character symbol generators, and for providing an image of a character symbol that is represented by said accessed one character symbol generator at a predetermined fixed position that is independent of said one character symbol generator accessed, comprising the steps of:

deviating a light beam that is incident from a first deviation angle to propagate along a given path;

deflecting said light beam from said given path at an angle representative of said one character symbol generator;
refracting said deflective light beam to provide a substantially collimated light beam;
reflecting said collimated light beam;
illuminating said one character symbol generator with said reflected collimated light beam to spatially modulate said light beam with a spatial modulation representative of said character symbol;
focusing said spatially modulated light beam;
deflecting said focused light beam to propagate along said given path; deviating said focused light beam to propagate at a second deviation angle wherealong said image is formed at said predetermined fixed position.

22. A method for imaging a preselected character symbol, from a multiplicity of character symbols, at a predetermined fixed image position that is independent of the character symbol selected as described in claim 21, further including the step of focusing said light beam incident at said first beam deviation angle to form a light beam with a given spot size.

23. A method for imaging a preselected character symbol from a multiplicity of character symbols at a predetermined fixed position that is independent of the character symbol selected as described in claim 22 wherein the step of deflecting said light beam at the deflection angle corresponding to said one character symbol generator accessed includes the steps of deflecting said light beam propagating along said given path at a first deflection angle in a predetermined plane, said first deflection angle corresponding to the angular position of said one character symbol generator in said predetermined plane; and deflecting said light beam deflected at said first deflection angle at a second deflection angle in a plane perpendicular to said predetermined plane said second deflection angle corresponding to the position of said one character symbol in said plane perpendicular to said predetermined plane.

24. A method for imaging a preselected character symbol, from a multiplicity of character symbols, at a predetermined fixed image position that is independent of the character symbol selected as described in claim 22 wherein the step of deflecting said light beam propagating along said given path includes:
deflecting said light beam in a predetermined plane at a deflection angle corresponsing to said one character symbol generator in said predetermined plane;
refracting said light beam deflected at said first deflection angle to change the direction of propagation; and
deflecting said refracted light beam in a plane perpendicular to said predetermined plane at a second deflection angle that corresponds to the position of said one character symbol generator in said plane perpendicular to said predetermined plane.

25. A method for accessing one character symbol generator, from a multiplicity of character symbol generators, and for providing an image of the character symbol that is represented by said accessed one character symbol generator at a predetermined fixed image position that is independent of said one character symbol generator accessed, comprising the steps of:
deflecting a light beam in a predetermined plane at a deflection angle corresponding to said one character symbol generator;
refracting said deflected beam to provide a substantially collimated light beam;
refracting said substantially collimated light beam in a plane perpendicular to said predetermined plane to illuminate a region about said one character symbol generator;
reflecting said illuminating beam through said one character symbol generator to spatially modulate said light beam with a spatial modulation representative of said character symbol;
refracting said spatially modulated light beam in said plane perpendicular to said predetermined plane;
focusing said spatially modulated light beam; and
deflecting said focused light beam to provide an image of said one character symbol at said predetermined fixed image position.

26. A method for imaging a preselected character symbol, from a multiplicity of character symbols, at a predetermined fixed position that is independent of the character symbol selected as described in claim 25, further including the steps of rotating a first polarization of said deflected light beam to a second polarization that is orthogonal to said first polarization and refracting said light beam with said orthogonal polarization at a refraction angle, in said plane perpendicular to said predetermined plane, that differs from the refraction angle for said first polarization.

* * * * *